United States Patent [19]

Rooney et al.

[11] 4,260,082
[45] Apr. 7, 1981

[54] MANUALLY OPERATED LIQUID DISPENSING DEVICE

[75] Inventors: Gerald A. Rooney, Hollywood; Richard E. Kresge, Miami; Jerry H. Miller, Miami Lakes, all of Fla.

[73] Assignee: The AFA Corporation, Miami Lakes, Fla.

[21] Appl. No.: 852,761

[22] Filed: Nov. 18, 1977

Related U.S. Application Data

[63] Continuation of Ser. No. 637,924, Dec. 5, 1975, abandoned.

[51] Int. Cl.³ .............................................. G01F 11/04
[52] U.S. Cl. .................................... 222/340; 222/380; 222/381
[58] Field of Search ............... 222/340, 384, 380, 387; 239/331, 333

[56] References Cited

U.S. PATENT DOCUMENTS

| 3,799,448 | 3/1974 | Nozawa et al. | 222/321 X |
| 3,940,029 | 2/1976 | Horvath | 239/333 |

Primary Examiner—Stanley H. Tollberg
Assistant Examiner—Frederick R. Handren
Attorney, Agent, or Firm—Thomas W. Brennan

[57] ABSTRACT

A manually operated, hand-held rechargeable liquid dispensing container device having a non-pressurized, either refillable or non-refillable receptacle or reservoir, is disclosed. The device comprises a relatively reciprocating piston and cylinder defining a pressurizable chamber therebetween which can be charged with liquid from the receptacle or reservoir in the container. The piston or cylinder is reciprocated relative to the other by a charging system connected to either one which compresses a resilient means such as a spring while simultaneously drawing liquid into the chamber through a check valve at the entrance of the liquid chamber. When the chamber is charged with liquid, hydraulic pressure is exerted upon the liquid by the now compressed spring. An improved charging system permits the hydraulic pressure application to be delayed until the check valve closes, insuring a full charge in the pressurizing chamber. The charge system also includes a pair of relatively rotatable parts which are respectively connected to the piston and cylinder such that rotation of one part relative to the other causes the reciprocal action between the piston and cylinder. A discharge valve and a discharge nozzle is also provided, whereby liquid in the charge or pressurizing chamber can be dispensed from the device in a spray if desired. End of stroke fast discharge flow shut-off and charging stroke completion indication is also provided.

20 Claims, 19 Drawing Figures

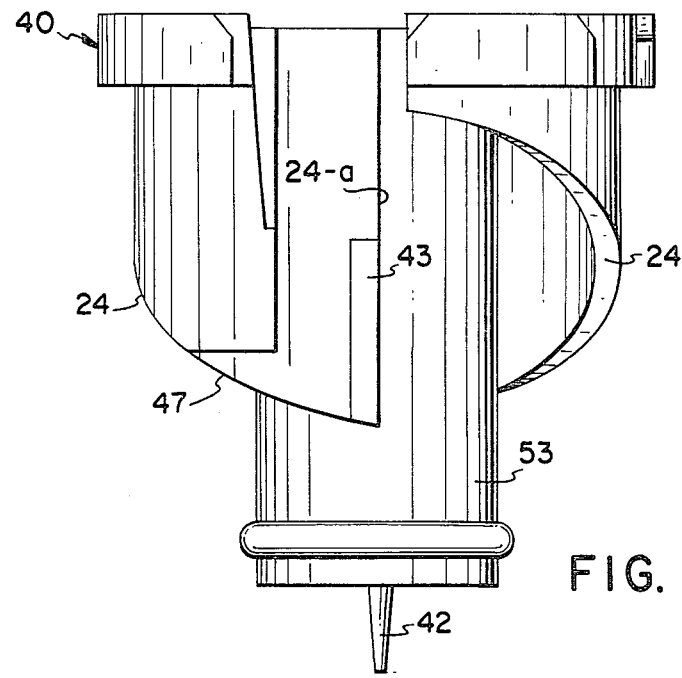
FIG. 10-a
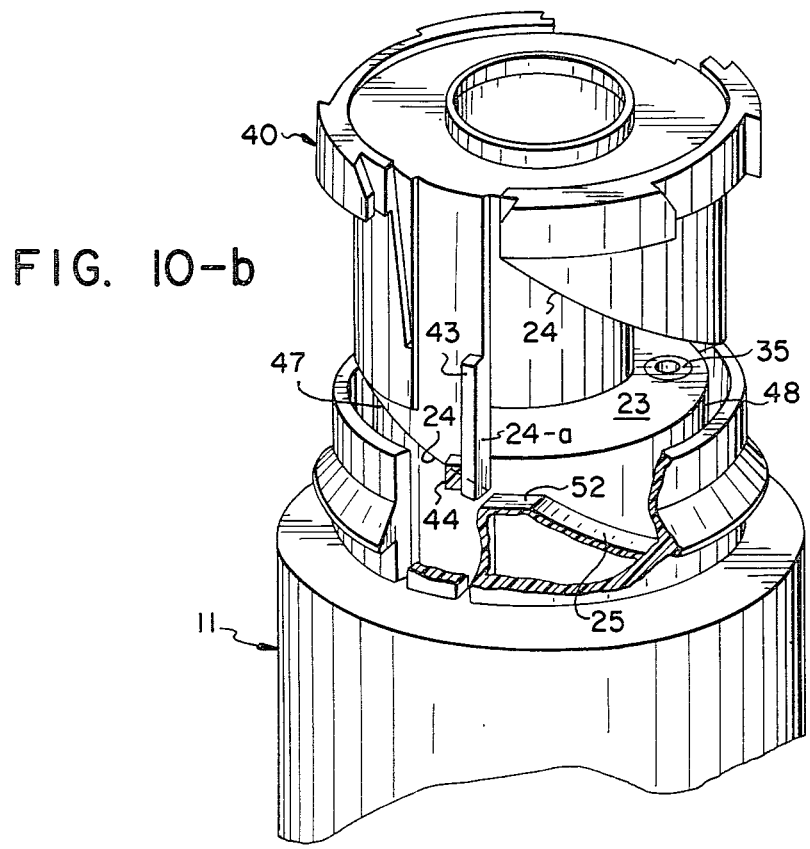
FIG. 10-b

4,260,082

MANUALLY OPERATED LIQUID DISPENSING DEVICE

This is a continuation of application Ser. No. 637,924, filed Dec. 5, 1975, now abandoned.

BACKGROUND OF THE INVENTION

1. Field of the Invention

This invention relates to improvements in liquid dispensing containers or devices of the type wherein a pressurizable chamber, contained within the device, is charged with liquid from a receptacle or reservoir also carried in the device. More particularly, this invention relates to improvements in rechargeable dispensers of the type referred to wherein means is provided for (a) insuring a full charge in the pressurizable chamber as long as there is liquid in the receptacle (b) a more precise liquid shut-off at the end of discharging by relieving liquid pressure in the charge chamber just prior to the end of discharging, and (c) positive indication of the end of the charging cycle of stroke.

2. Description of the Prior Art

Various types of liquid dispensers, spraying devices or sprayers have been proposed for discharging liquids in a spray from a container to eliminate prepressurization with propelling gases and the like as in aerosol atomizing sprayers. Among such prior art dispensers is a manually operated, rechargeable sprayer described in a co-owned to Carl E. Malone U.S. Pat. No. 3,471,065, issued Oct. 7, 1969, which has two telescoping parts surrounding an inner chamber which is to be charged with liquid. Charging of the inner chamber is accomplished by forcefully pushing or pulling the telescoping parts, the force being directly linearly applied in a pumping action. This pumping action compresses a spring and simultaneously causes liquid to be drawn into the charge chamber. The piston urged by the compressed spring pressurizes the liquid in the chamber which also closes a check valve positioned at the entrance to the chamber. A discharge valve is also provided to release the liquid by discharging it through a nozzle mounted above the discharge valve.

Other types of rechargeable liquid dispensing devices are also known to the art wherein one part is rotated relative to another part to reciprocate a piston in a cylinder to define a pressurizable liquid containing chamber therebetween. The liquid in the pressurizing chamber is maintained under hydraulic pressure by a spring as in the previously described telescoping parts device. Examples of this type of dispenser aredisclosed in U.S. Pat. No. 3,790,034, issued Feb. 5, 1974, U.S. Pat. No. 3,792,800 to Nicholas G. Capra et al., issued Feb. 19, 1974, and U.S. Pat. Nos. 3,746,261, 3,777,945, 3,797,748, and 3,799,448 all to T. Nozawa et al., and issued on July 17, 1973, Dec. 11, 1973, Mar. 19, 1974 and Mar. 26, 1974 respectively. These patents disclose rechargeable sprayers wherein a biasing member or restoring spring is compressed by rotating one part of the device relative to another part, to "cock" the same. At the same time liquid is drawn into a pressurizable chamber formed by the piston vacating the cylinder in which it reciprocates. The liquid is thereafter subjected to hydraulic pressure developed by the compressed spring. First issued Nozawa et al U.S. Pat. No. 3,746,261 discloses a cocking mechanism of this type using a ball-in-track system to convert rotary motion to reciprocating. In second issued Nozawa et al U.S. Pat. No. 3,777,945 is described a similar device with the rotating parts being a two-piece press-on cap and a container with an inner, transverse wall which defines an auxiliary sump or chamber in which liquid under pressure can be stored prior to discharge. Third issued Nozawa et al U.S. Pat. No. 3,797,748 discloses a similar device but with a rigid discharge conduit leading from the pressure chamber to a discharge nozzle. Last issued Nozawa et al U.S. Pat. No. 3,799,448, discloses a similarly operating sprayer but has incorporated therewith various valving devices or means to effect precise liquid discharge flow shut-off.

Other prior art, in particular, also co-owned, U.S. Pat. No. 3,779,464 to Carl E. Malone, issued Dec. 18, 1973, discloses a fingertip pump sprayer adapted to be mounted on a liquid container which features a ball check valve and associated piston, the valve being alternately opened and closed during pumping. An added feature is an anti-dribbling device on the piston which contacts the ball to dislodge it at the end of a piston discharge stroke.

Still other prior art pump sprayers are known, also hand-held, manually operated trigger devices. These all have the common disadvantage of requiring continual and/or rapid application of force for continued spraying rather than, as in the present invention, a single cocking action to produce a steady stream of liquid over a predetermined period of time. These trigger devices enjoy relatively wide spread usage possibly because of their relatively low cost which may compensate in some measure for their inherent disadvantages which are; poor spray rate control, poor atomization and a requirement to expend more physical effort to operate.

In contrast, rechargeable dispensers of the type represented by the present invention are capable of producing constant spray rates under controlled conditions for predetermined durations. The advantages of the present invention over U.S. Pat. No. 3,471,065 above mentioned, are less effort to operate since the latter requires a relatively high cocking force to charge the liquid to the pressure chamber and smaller size or package while maintaining the same, or even increased volume of liquid spray. The rotating parts rechargeable sprayer, as disclosed in above mentioned U.S. Pat. Nos. 3,790,034 through 3,799,448, while resolving the dimensional and cocking force problems of U.S. Pat. No. 3,471,065, have other deficiencies, e.g., no way to positively determine the end of a charging cycle, and/or to insure a full charge is present in the chamber. U.S. Pat. No. 3,799,448, while disclosing several ways to produce precise spray shut-off, accomplishes the same less economically using complicated structure and, in addition, lacks the capability of insuring a full charge in the chamber before pressurization.

These disadvantages of the above and other prior art rechargeable dispensing containers are believed overcome by the present invention.

SUMMARY OF THE INVENTION

This invention relates to improvements in liquid dispensing devices of the rechargeable type. In particular, this invention relates to improvements in hand-held liquid dispensers for producing mist sprays, as fine, or finer than those produced by aerosol spraying and trigger pump devices, and yet are capable of being recharged. More particularly, this invention relates to rechargeable sprayers which are relatively simpler in construction, are capable of shut-off in a more precise manner at the end of a discharge cycle, and in addition, provide insurance that a full liquid charge is present before being subjected to pressurization.

It is therefore an object of the present invention to provide an operatively efficient, economically constructed, rechargeable liquid dispensing container device having movable end closures which is capable of being refilled and spray in a fine mist many of the common liquid materials such as insecticides, and medicines, such as antibiotics, alcohol and the like.

Another object is to provide a sprayer of the character described, in which the liquid may be sprayed from most any position or attitude so long as liquid remains in the container.

Still another object is to provide a rechargeable sprayer of the character described which is safe, requires no pre-charging with high pressure gases and the like and which is yet capable of dispensing liquid under relatively high pressure in the form of a fine mist, the bulk of the liquid being stored in the device at atmospheric pressure.

A further object of the invention is to provide a rechargeable liquid dispenser of the character described, in which is incorporated means for insuring a full charge in the chamber prior to pressurization thereof and is capable of positive indication of the end of a charge cycle or stroke.

Other objects, features and advantages of the present invention such as means for precise liquid flow shut-off also be evident from the following description taken in connection with the accompanying drawings.

BRIEF DESCRIPTION OF THE DRAWINGS

FIG. 10a is a front elevation of a modified piston of the invention;

FIG. 10b is a front perspective fragmentary view, similar to FIG. 9, showing a movable section of the invention modified for use with the modified piston of FIG. 10a;

DESCRIPTION OF THE PREFERRED EMBODIMENT

Figure 1:
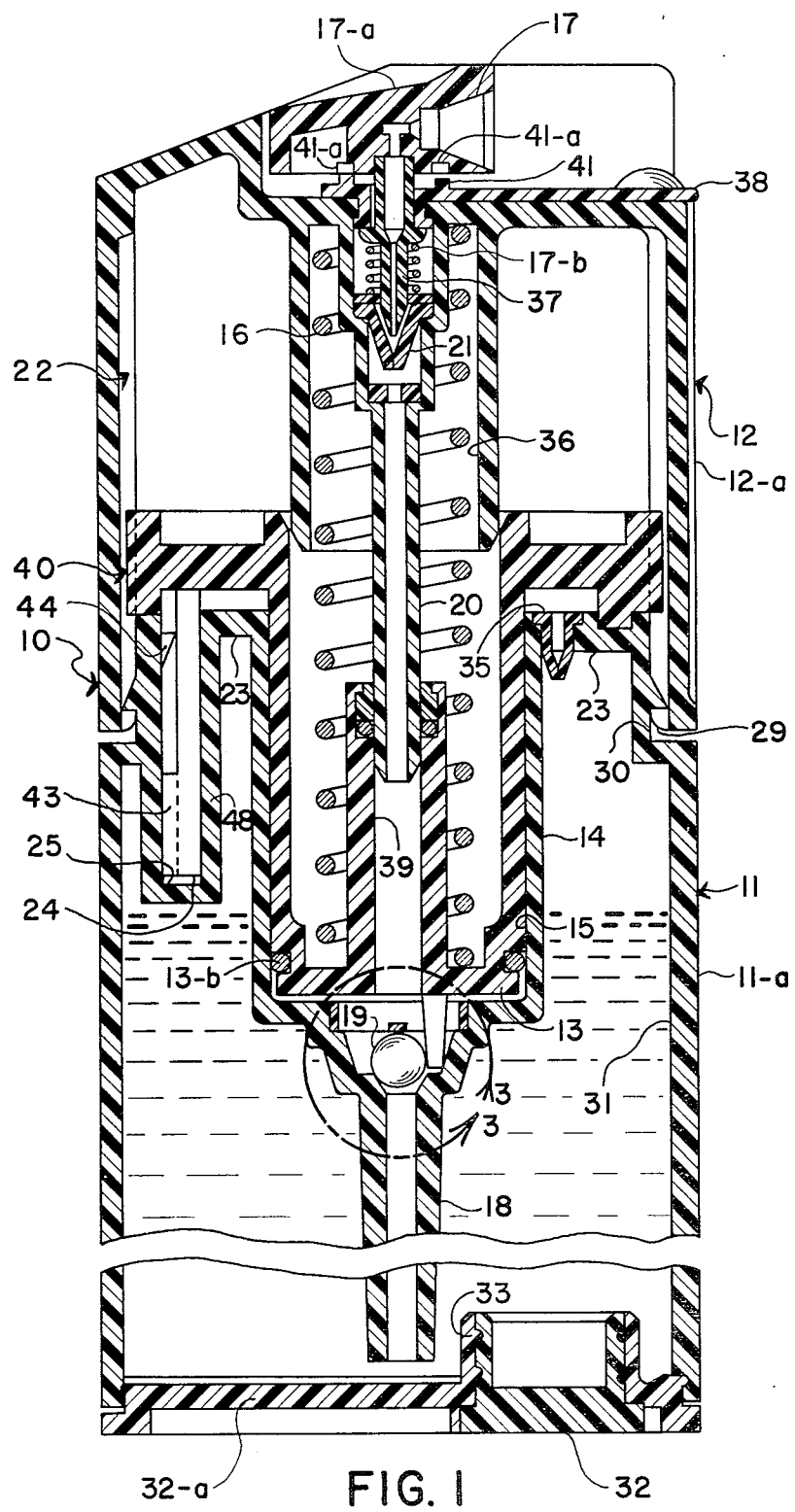
FIG. 1 is a vertical section of one embodiment of a liquid dispenser constructed in accordance with the present invention illustrating the same in an uncharged, or unloaded condition.

Referring in more detail to the accompanying drawings, FIGS. 1 through 12 illustrate a preferred embodiment of a liquid dispenser or dispensing container device 10, which preferably is dimensioned to be conveniently held in the hand much in the manner of the familiar aerosol can to which most people are accustomed.

Briefly, dispenser 10 comprises a pair of relatively movable sections 11 and 12 which sections comprise opposite end closures or ends for sprayer 10 and which are joined together in rotatable relationship by means of engagement of the lower peripheral ridge or shelf 29 of upper movable section 12 with bevelled rim or notch 30 on lower movable end closure or section 11.

Movable sections 11 and 12, as indicated, form opposite ends, or end closures for dispenser 10 and, as will be clearer when considered in the light of the description of the operation of the invention hereinafter, constitute main operating parts of the invention.

In FIG. 1, lower movable end closure or section 11 is a container body structure having a receptacle 31 with sidewalls 11-a which may be a single tubular sidewall, and a bottom 32-a fixed to the bottom end of sidewalls 11-a. A recloseable plug 32 in a threaded fitting 33, provides a means for filling receptacle 31 with liquid. A cylinder 14 is centrally mounted in the upper end of container section 11 being connected to sidewalls 11-a by an annular top wall 23 through a pair of operating members 25. Members 25, in general, comprise a pair of cams or cam followers, as will become apparent, having vertical end surfaces 25-a (see FIG. 7).

A centrally disposed liquid inlet conduit 18 extending upwardly from a pair near the bottom of receptacle 31 to cylinder 14 provides liquid communication between the interior chamber 15 of cylinder 14 and receptacle 31. Conduit 18 at its top portion is enlarged to provide an entrance to cylinder 14 and is formed with a valve seat which receives in sealing engagement therewith a ballcheck valve 19. A ball or valve retainer 34 is fitted over valve 19 to limit its upward movement, being inserted in a second enlargement thereover.

An atmospheric air inlet or vent valve 35 is provided in annular top wall 23 to vent receptacle 31 to the atmosphere, insuring pressure equalization therein. Vent 35 is shown as a so-called "duck bill" type of valve having flexible sidewalls and an opening at the lower end thereof, whereby above-atmospheric pressure in receptacle 31 causes the sidewalls to come together and close the opening, whereas below-atmospheric pressure expands the sidewalls and opens valve 35 allowing air to flow into receptacle 31 to replace liquid drawn up into chamber 15. It is, therefore, desirable to fabricate valve 35 from elastomeric materials to insure its operation as above described, although, obviously, other types of check valves for venting receptacle 31 can be used.

Figure 2:
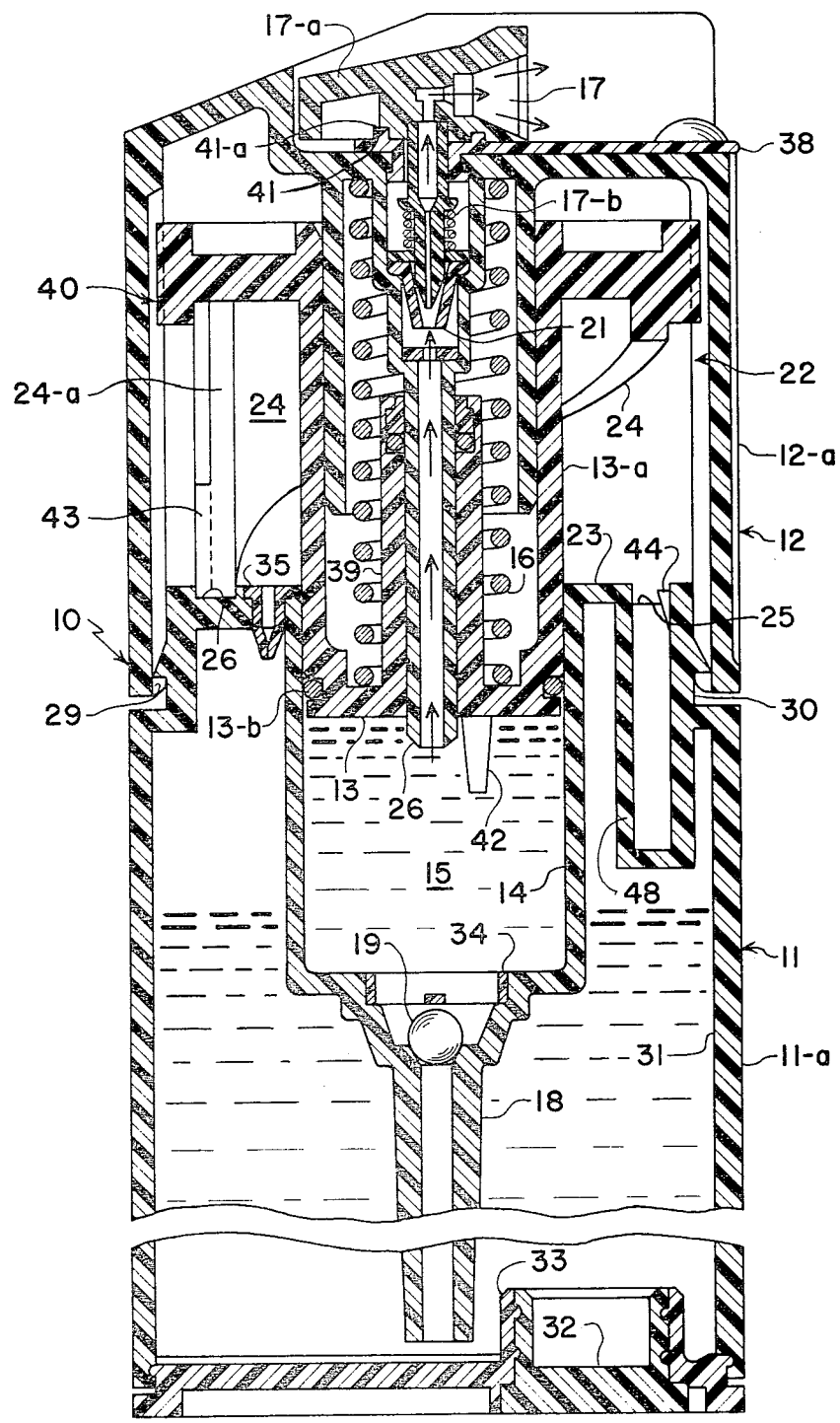
FIG. 2 is a vertical section of the embodiment of FIG. 1 illustrating the same in a charged, or loaded condition.

Upper movable section, cap, or end closure 12, which also constitutes a spray housing, comprises an interiorly disposed, cylindrical recess 36 depending from the top thereof for receiving one end of a resilient means or biasing member 16, in the form shown of a coil compression spring, and an outlet conduit 20 preferably of rigid material, centrally disposed therein (FIGS. 1 and 2), Uppermost in rigid outlet conduit 20 is a normally closed, flexible element discharge valve 21. A depressable push-button 17-a is mounted on the top end of a hollow valve stem 37 the opposite end of which extends into valve 21. Thus, as indicated in FIG. 2, push-button 17-a can be depressed, as by the application of finger pressure to thereby drive the end of valve stem 37 against the walls of valve 21 forcing it to open and permit liquid to flow out through a nozzle 17 formed in push-button 17-a. Valve 21 closes upon release of button 17-a being returned to its previous position by a compressible spring 17-b.

A safety lever 38 swivelled on stem 37 between push-button 17-a and valve 21, swivels thereon between two positions; in one position, a pair of stops 41 engage the underside of button 17-a preventing downward movement thereof when depressed; in a second position, stops 41 engage associated recesses 41-a in the bottom of push-button 17-a permitting the latter to be depressed to open valve 21.

At its lower, or opposite end, rigid outlet 20 slidably and sealingly engages a straight, also rigid central tube 39 in a piston rod 13-a of a piston 13, the latter being mounted in cylinder 14 for relative reciprocating therein between two extreme positions. Piston 13 defines with cylinder 14 a pressurizable chamber 15 above described, and sealingly reciprocates therein under pressure tight condition provided by an "O" ring seal 13-b on piston 13.

Piston 13 has a circumferentially extending flange or collar constituting a spline or spline shaft 40. Spline 40 mates with the formed interior surfaces of upper movable cap or housing section 12 which constitutes a spline mating bore 22 to receive spline 40 in sliding reciprocating movement thereof with piston 13, thereby insuring a positive connection between the latter and movable spray housing or end closure 12, as shown in detail in FIG. 8.

Figure 4:
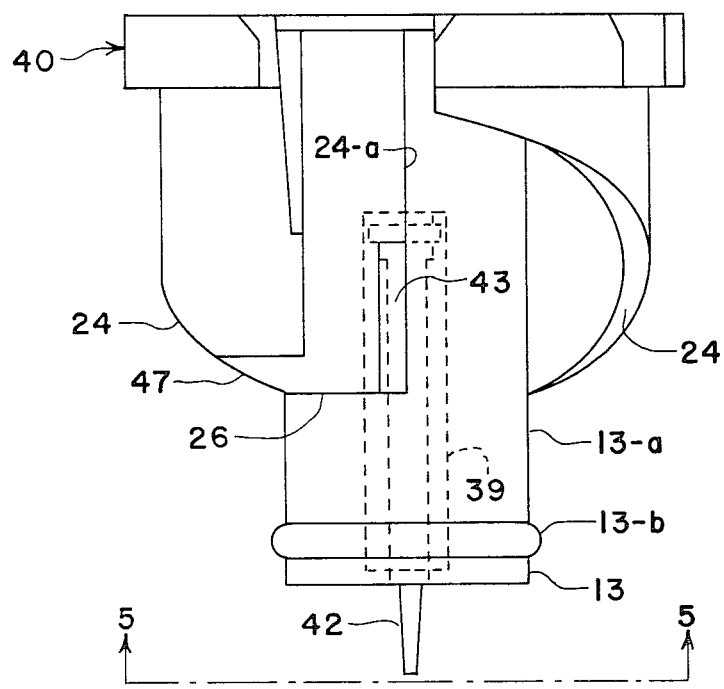
FIG. 4 is a front elevational view of the piston of the invention.

Fixed to the underside of piston 13, between piston rod 13-a and spline 40 is a pair of operating members 24 having vertical end surfaces 24-a, shown more clearly in FIG. 4 as substantially semi-circumferentially extending helical cams or cam followers (also shown in FIGS. 1, 2, 9, 10, and 12). Cam operating members 24 slidingly contact similarly shaped lower rotating section container 11 operating members 25 whereby rotation of either one of upper or lower sections 12 and 11 relative to the other results in relative reciprocating between piston 13 and cylinder 14.

Figure 3:
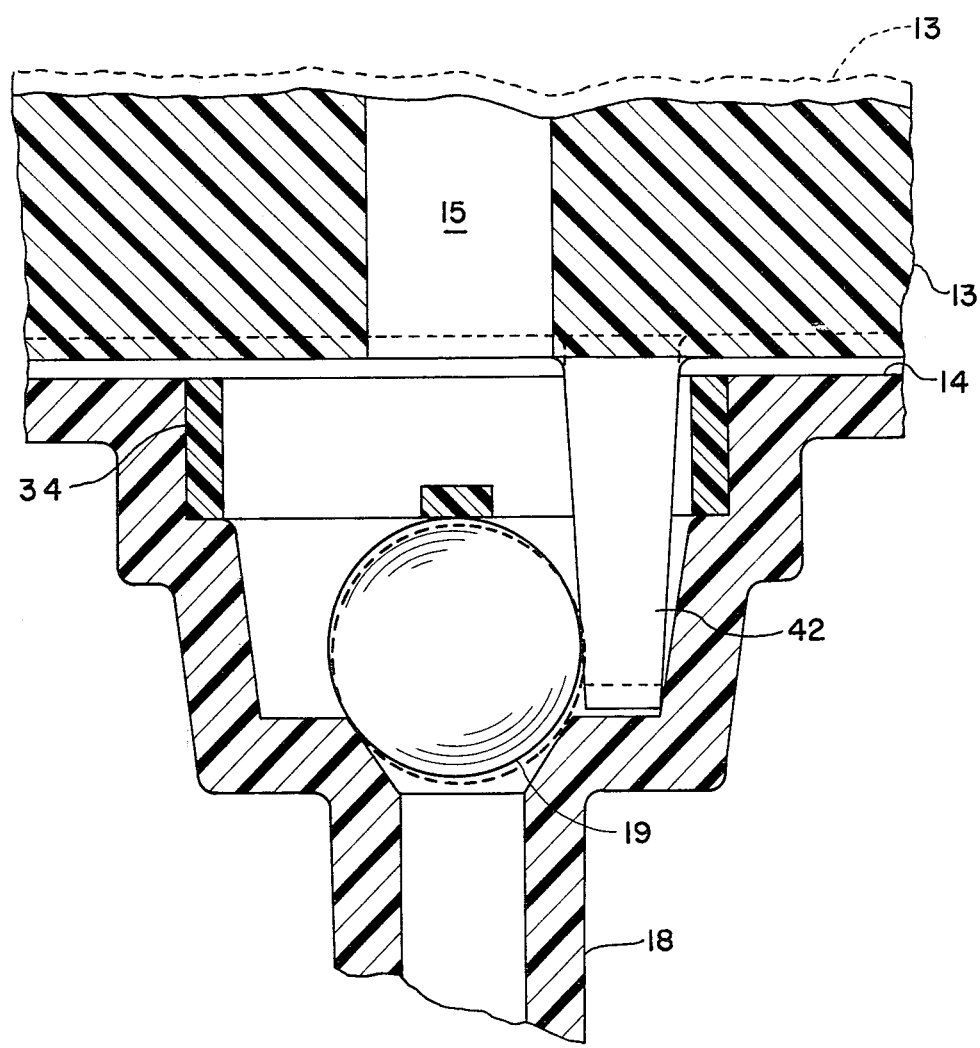
FIG. 3 is a portion of the invention on an enlarged scale within the dash line circle 3—3 in FIG. 1.
Figure 7:
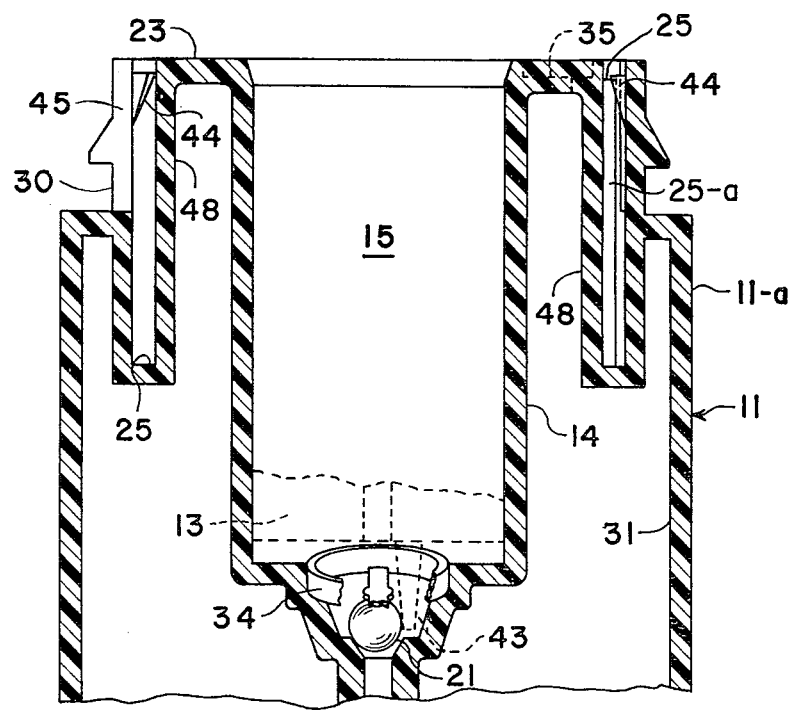
FIG. 7 is a fragmentary, vertical section, partially in perspective; of the movable section or container of FIG. 6 taken on line 7—7 thereof.

Referring again to FIGS. 3 and 4, in particular FIG. 3, piston 13 has a downwardly depending projection or probe 42 attached to the lower end thereof. Probe 42 is carried by piston 13 and in the bottom most position thereof in cylinder 14, passes through retainer 34 and contacts check valve 19, dislodging it from its seat in conduit 18. The dotted lines of FIG. 3 indicate the positions of piston 13, probe 42 and check valve 19 at the time of contact just prior to dislodging of valve 19 from its seat to open it and permit liquid in charge chamber 15 to flow back into receptacle 31. FIGS. 3 and 7 illustrate the projection or path of probe 42 through valve retainer 34 as it contacts valve 19 at the appropriate time in the liquid discharge cycle.

Figure 5:
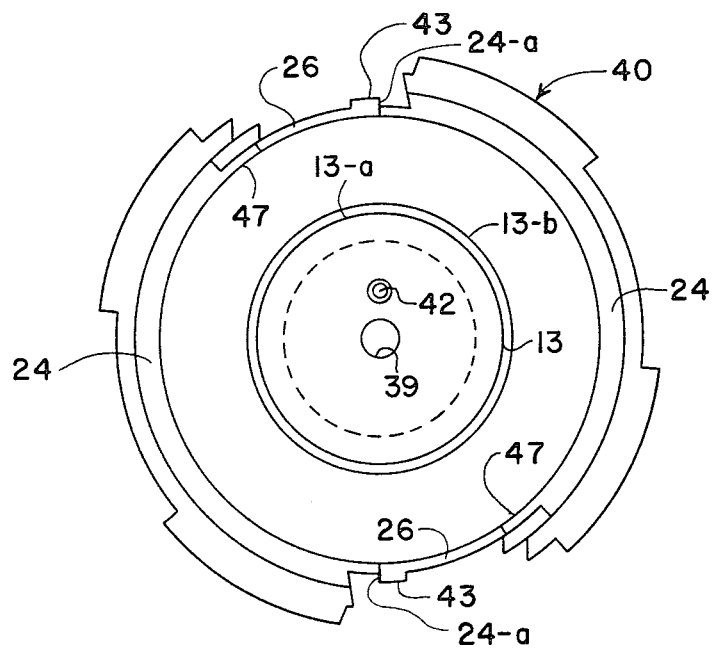
FIG. 5 is a bottom view of the piston of FIG. 4 taken on line 5—5 thereof.
Figure 8:
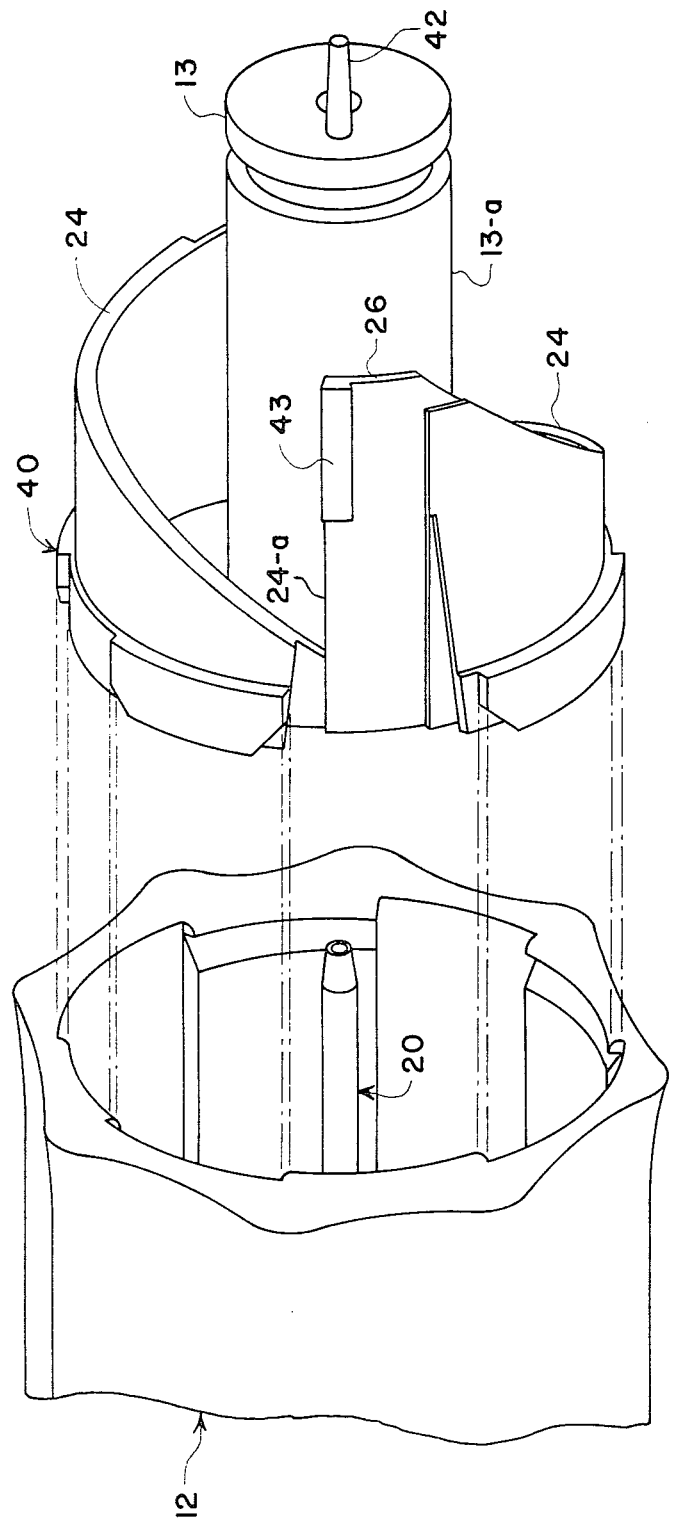
FIG. 8 is a perspective, exploded view of another movable section comprising a top end closure operating member and a piston of the invention.
Figure 10:
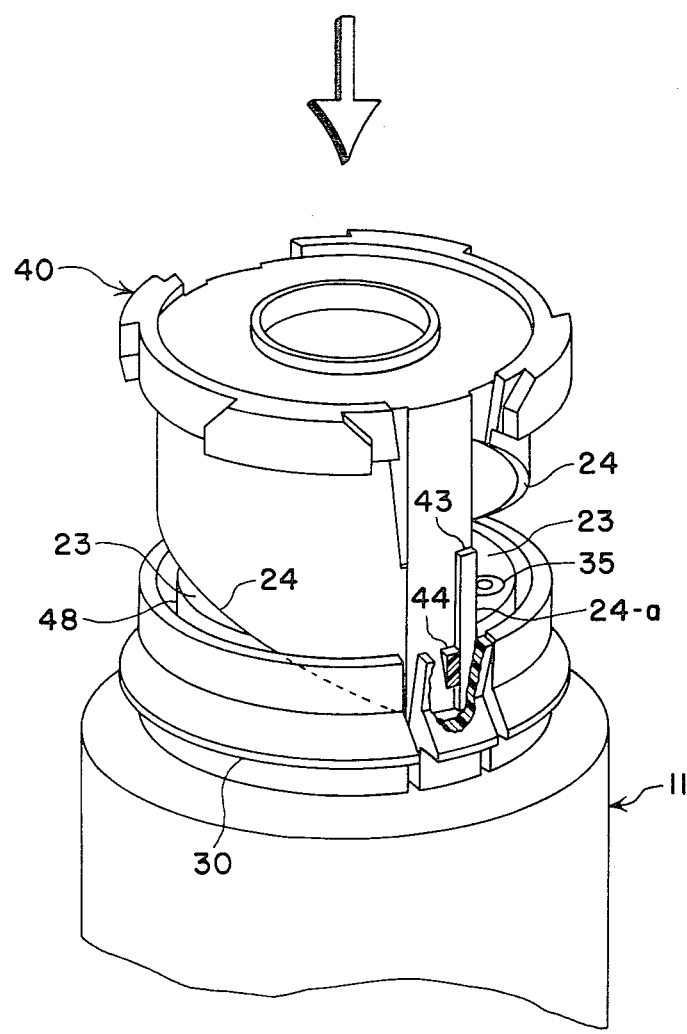
FIG. 10 is a view similar to FIG. 9 illustrating the relationship of the same parts in a more advanced operating stage.

Referring now to FIG. 8 together with FIGS. 4 and 5, means to insure a full liquid charge in chamber 15 is illustrated comprising plateaus 26 in the form of flatted portions on the ends of members 24 which constitute a pressurization delay or dwell. Alternatively the pressurization delay or dwell devices will be formed on operating cam members 25 on the upper or terminal portions 52 thereof, as shown in FIG. 10-b. In this instance a modified piston 53, as shown in FIG. 10-a, will be used which has no terminal flat portions on cam operating members 24. As mentioned previously, dwell plateaus or pressurization delay devices 26 on members 24, or devices 52 on members 25, are flat surfaces formed in the ends, or terminal portions of these members and, in operation, cooperate, as will become apparent hereafter, to effect a delay in pressurizing the liquid in chamber 15.

It has been found that such delay is beneficial and desirable to permit valve 19 to close before the liquid in chamber 15 is subjected to hydrostatic pressure from compressed spring 16. Retainer 35 provides a restraint on valve 19 preventing it from moving upwardly too far, allowing the latter to return to its seat, i.e., close, before the liquid in chamber 15 is pressurized, since as long as cams 25 contact plateaus 26, the force of compression of spring 16 is isolated from the liquid.

Figure 6:
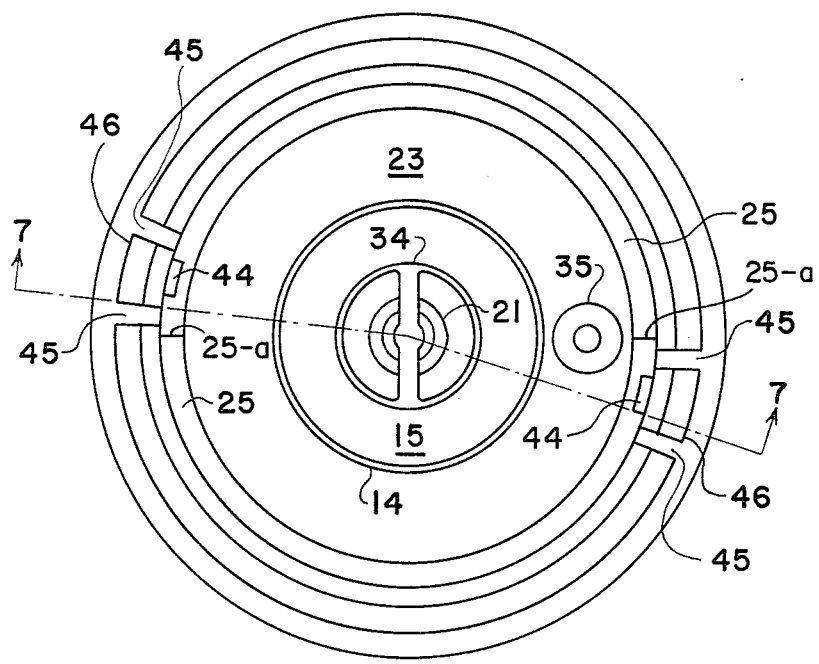
FIG. 6 is a top view of a movable section including a container of the embodiment of the invention shown in FIG. 1.
Figure 9:
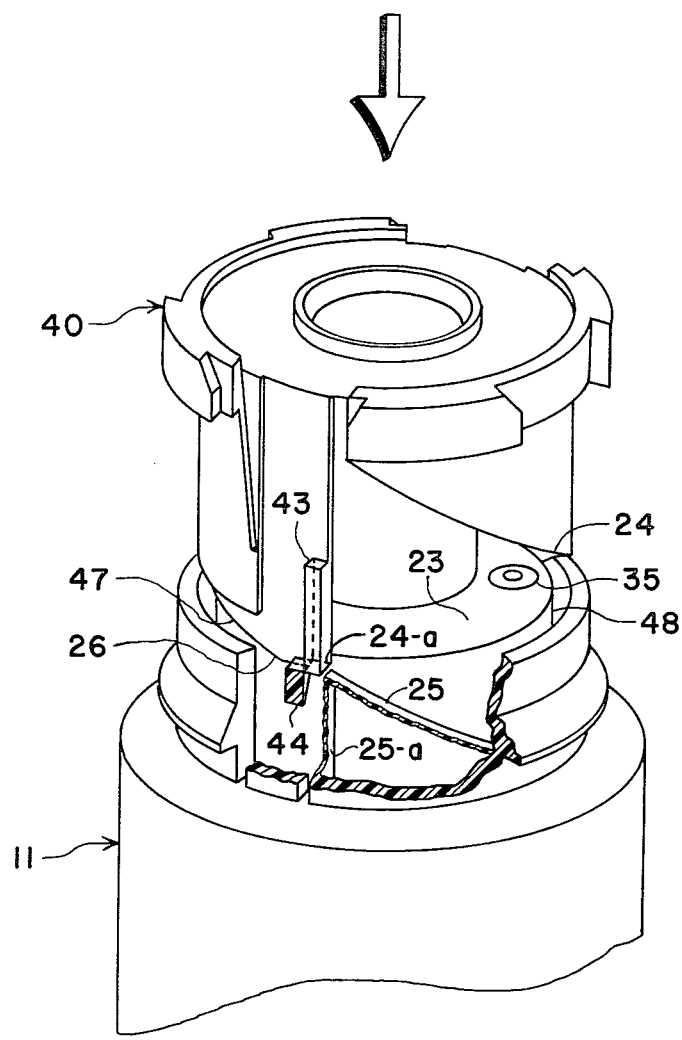
FIG. 9 is a fragmentary, front perspective view of the invention, some of the parts removed, showing the piston of FIG. 8 mounted in the movable section of FIG. 7, partially broken away, illustrating the relationship of these parts in the initial, operating stages.

Also in FIGS. 4 and 5, the outer sides or surfaces of operating members 24 of piston 13, are undercut leaving a vertical portion comprising a guide 43 (also shown in FIGS. 9 and 10). In FIGS. 6 and 7, container 11 has two pairs of diametrically opposed slots 45, each slot 45 in each pair being circumferentially spaced apart or separated by a hinge element or flexible segment 46 and extending vertically downward from the top edge of container 11 to the bottom of rim or notch 30 as an integral part thereof. A detent 44 is formed on each of the inner surfaces of flexible segment 46.

Figure 11:
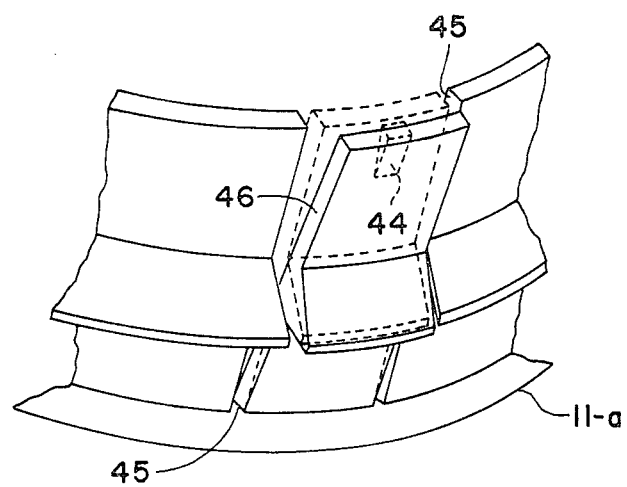
FIG. 11 is a fragmentary, perspective view of a detail of a flexible segment on one of the movable sections of the invention.

In FIG. 9, upper section or cap 12 has been omitted for clarity and container 11 is shown in a fully rotated position corresponding to FIG. 2 wherein cam members 25 contact with pressurization delay plateaus 26 on members 24 of piston 13 has ceased and contact by guide 43 with detent 44 on hinge element or flexible segment 46 has been initiated. Before leaving contact with cam member 24, a thin leading edge portion 47 thereof wedges between detent 44 and the vertical wall 48 supporting annular top wall 23, causing a slight outward displacement of flexible segment 46 about its attachment to container 11 thereby facilitating contact of guide 43 with detent 44. The outward movement or displacement of hinge segment 46, somewhat exaggerated, is illustrated more clearly in FIG. 11, the dotted lines showing the unflexed position. In FIG. 9, parts being omitted for clarity, leading edge 47 is shown having wedged passed detent 44 (segment 46 being displaced as shown in FIG. 11) and guide 43 is in contact with detent 44. In this position chamber 15 is fully charged and further rotation of container 11 is inhibited by detent 44 on guide 43. Piston 13 is now beginning a discharge stroke and liquid in chamber 15 is placed under pressure by spring 16 (not shown). In FIG. 10, also indicating the manner in which hinge segment 46 is outwardly displaced, the discharge cycle, initiated in FIG. 9 has advanced to a position in which operating member 25 is no longer in contact with pressurization delay or dwell 26, and check valve 19 has closed. In addition, though not shown, it should be understood that some liquid has been discharged from chamber 15 since piston 13 has moved vertically downwardly (arrow FIG. 10) a slight distance with guide 43 slidably contacting detent 44 on one side and vertical surface 25-a on cam operating member 25 on the oppositely disposed or vertical surface 24-a of cam operating member 24.

Figure 12:
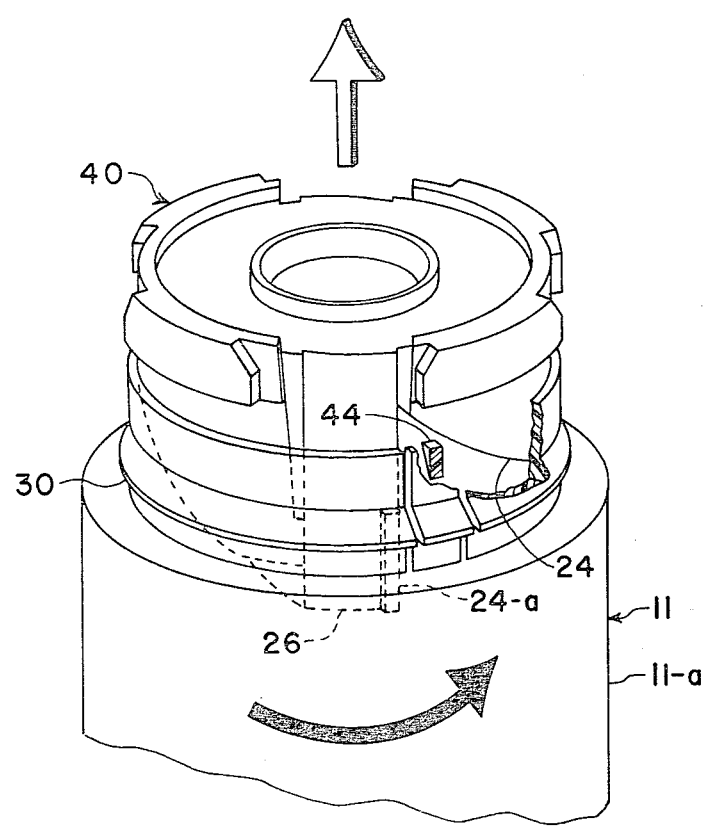
FIG. 12 is a view similar to FIGS. 9 and 10 illustrating the relationship of those parts in the initial, operating stages to charge the invention with liquid.

Referring now to FIG. 12, container 11 is shown in a partly rotated position, as indicated by the curved arrow, and piston 13 has moved upwardly, as indicated by the straight arrow, to a position in upper section or cap 12 (not shown) at the initial stage of a charging stroke. In this position detent 44 no longer contacts cam member 24 or guide 43 and hinge segment 46 returns to its original, unflexed position.

In operation of the present invention, receptacle 31 (FIGS. 1 and 2) in container 11 is filled with liquid by removing recloseable plug 32 and filling receptacle 31 with liquid through the opening in threaded fitting 33. After receptacle 31 is closed by replacing plug 32 chamber 15 is ready for charging as follows; sprayer or spray container device 10 is grasped in the left-hand, upper rotating section or cap 12 being held stationary. Lower rotating section or container 11 is grasped in the right hand and rotated to the right one half turn (180°) until resistance to further turning is encountered indicating in a positive manner that chamber 15 is now fully charged. In the above charging cycle, rotation of container 11 causes operating member 25 in container 11 to rotate therewith and in the same direction. As shown in FIG. 1, operating members 25 mate with operating members 24 in sliding contact and piston 13 rises up into rotating sprayhead section 12 in spline mating bore 22 on spline 40. As piston 13 rises up into upper rotating member 12 it vacates chamber 15 and compresses resilient means or spring 16. As chamber 15 is vacated a slight vacuum above valve 19 is created, which unseats valve 19 opening it and liquid from receptacle 31 flows into chamber 15, filling it. In FIG. 2 chamber 15 is shown fully charged with liquid, piston 13 has risen to a position near the top of rotatable sprayhead 12, spring 16 is fully compressed and valve 19 is closed. However, just prior to completion of the half turn resulting in the FIG. 2 position an important aspect of the present invention constituting an improvement over prior art sprayers has come into operation which may not be readily apparent. Operating members 25 on container 11 have encountered the flatted portions or delay plateaus 26 on cams 24. Continued rotation of container 11, however, does not result in a further upward movement of piston 13, and compression energy of spring 16 remains isolated from the liquid in chamber 15 since piston 13 is still bearing upon and being supported by container 11 through members 25. This delay in pressurization of liquid in chamber 15 permits valve 19 to close first, then when members 25 leave contact with plateaus or dwells 26, a full charge in chamber 16 is assured. In other words, until piston 13 is no longer operatively connected with container 11, the liquid charge in chamber 15 remains unpressurized. In addition, at this point in the charging cycle, the liquid flowing through valve 19 is no longer subject to a vacuum since piston 13 is now halted in its upward movement and further expansion or enlargement of chamber 15 ceases. Ball or valve 19 being limited in its upward movement by retainer 34 returns by gravity to its valve seat and valve 19 closes. Continued rotation of container 11 operatively disconnects operating members 25 from pressurization delay means, plateaus or dwells 26 and members 24 leaving spring 16 free to urge piston 13 downwardly against the liquid in chamber 15 which is thereby subjected to hydraulic pressure, and since valve 19 has already closed, piston 13 will not move downwardly against the liquid in chamber 15.

Spray container 10 is now ready to be operated to spray liquid by placing the finger against the upper part of push-button 17-a and depressing the same after first insuring that safety lever 38 is in the proper position so that recesses 41-a can receive in engagement therewith stops 41 thereby permitting push-button 17-a to be depressed. Depression of push-button 17-a, urges valve stem 37 downwardly into resilient valve member 21 opening the same. Liquid in chamber 15 flows upwardly through tube 39 into outlet conduit 20, through open valve 21 and out through the nozzle 17 in push-button 17-a, in a form of a spray or mist if such is desired, providing of course, nozzle 17 is dimensioned to cause such spray or mist.

In discharging liquid from chamber 15, the present invention also has incorporated a further improvement resulting in a precision shut-off of liquid. As illustrated in FIGS. 1-3, in particular FIG. 3, valve 19 is closed (FIG. 2 and dotted lines FIG. 3). Liquid flowing upwardly from chamber 15 (arrows FIG. 2) through valve 21, which is open, under urging of piston 13 by spring 16 is being discharged from dispenser 10. As piston 13 nears the bottom of chamber 15, projection or probe 42 thereon strikes the side of valve 19 and dislodges it from its seat with an accompanying immediate relief in hydraulic pressure in chamber 15. Discharge of liquid from nozzle 17 ceases abruptly in a precision flow shut-off not heretofore obtained in these devices.

Figure 13:
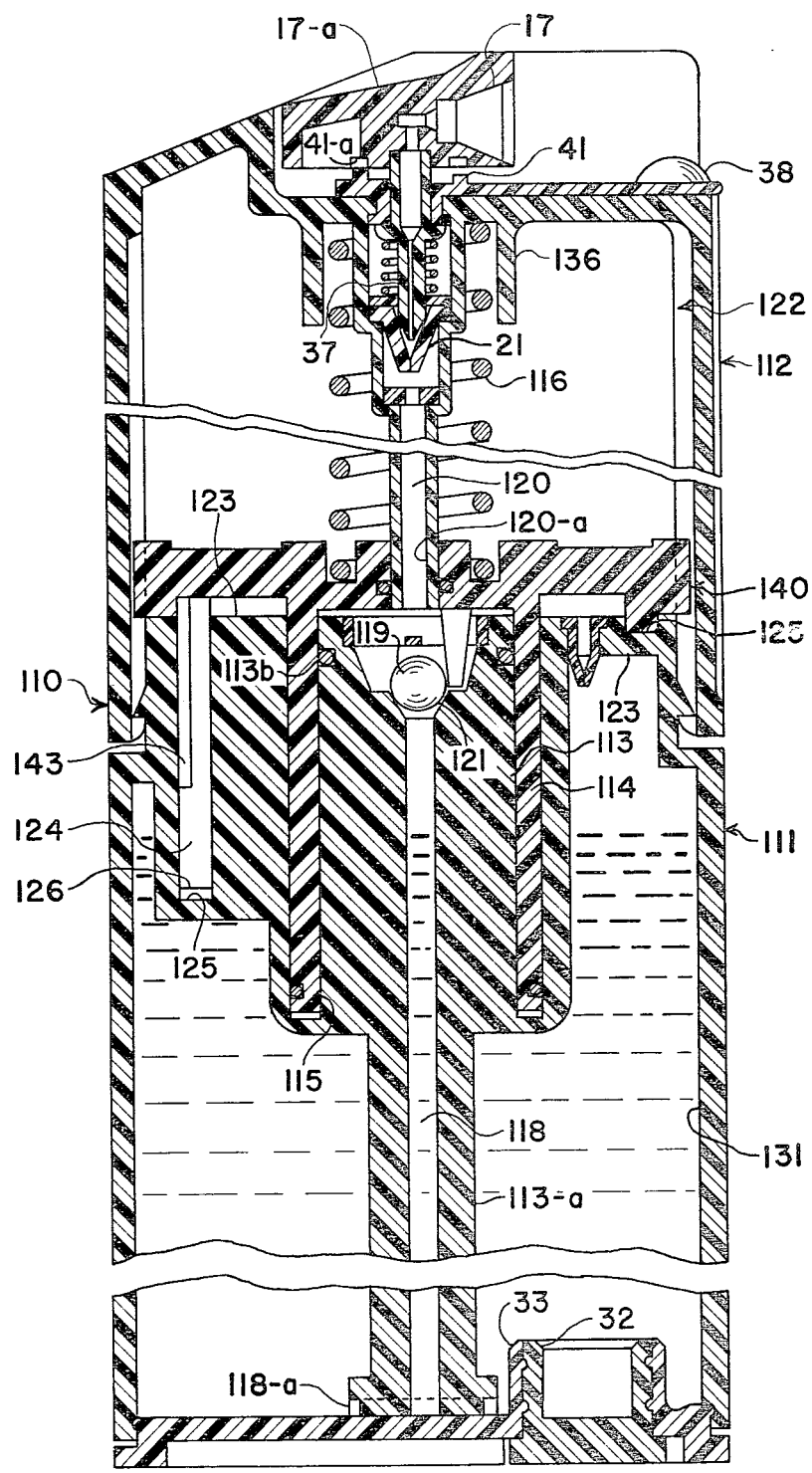
FIG. 13 is a vertical section of another embodiment of the present invention illustrating the same in an uncharged condition.
Figure 14:
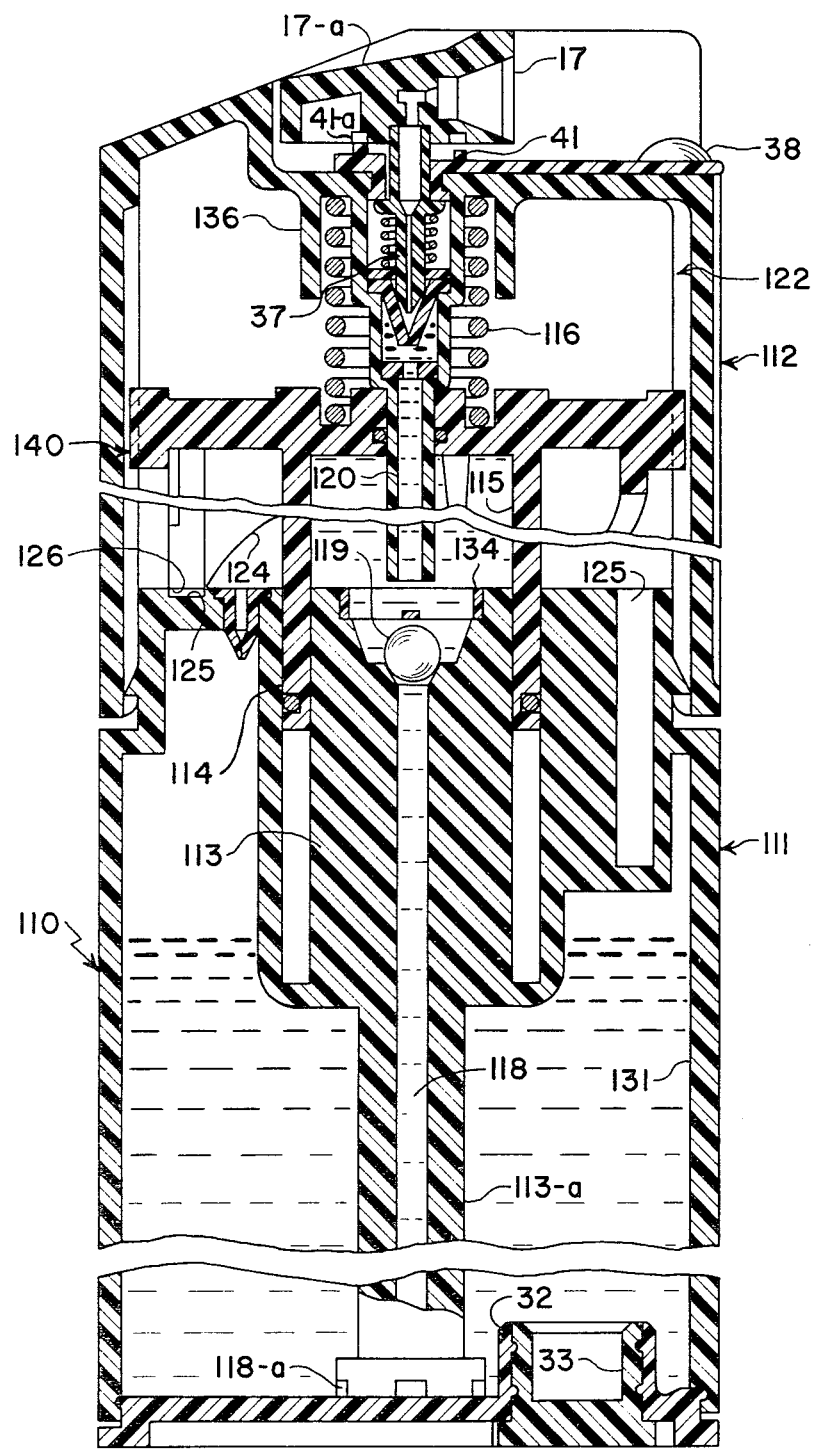
FIG. 14 is a vertical section of the FIG. 13 embodiment of the invention in a charged condition.

Referring now to FIGS. 13 and 14, there is illustrated another embodiment of the invention comprising a spray container 110 having generally the same configuration as the preferred embodiment sprayer 10 previously described. Spray container 110 comprises two relatively movable upper and lower spray and container sections 112 and 111 respectively, which also constitute end closures therefor. Movable container section 111 comprises one end closure for sprayer 110 and includes a receptacle 131 with the same bottom recloseable plug 32 in threaded fitting 33 for filling receptacle 131 with liquid. Fixed to the bottom of container 111 is an upstanding piston rod 113-a terminating in a stationary piston 113. Piston rod 113-a has a conduit 118 centrally disposed therein which communicates with receptacle 131 through liquid inlets 118-a at the bottom thereof. A pair of operating cam members 125 are formed in container 111 and are connected to piston 113 through annular wall or bulkhead 123.

Upper spray section 112 constitutes an opposite end closure for sprayer 110 and is mounted for relative rotation on container section 111 in the same manner as in the preferred embodiment of the invention, previously described. A recess 136 in spray section 112 depending from the top interior wall thereof receives one end of a resilient spring 116 therein. A movable cylinder 114 is slidably mounted in spray section 112 on a spline 140 in a spline mating bore 122 for reciprocation on piston 113 in container section 111. The opposite end of spring 116 is received in a cavity formed in the top surface of cylinder 114, which connects spline 140 thereto, whereby cylinder 114 is urged in a direction away from section 112 over, or on piston 113. Conduit 118 in container 111 has a first enlargement in its top portion which provides a valve seat for a check valve 119 and a second enlargement which contains a valve retainer 134 to restrict upward movement of valve 119.

A rigid outlet conduit 120 communicates with and extends from valve 119 through valve stem 37 and discharge valve 21 passing through a central bore 120-a in cylinder 114 in sealing relation therewith. Push-button 17-a and discharge nozzle 17, together with safety lever 38, are all exactly as for the preferred embodiment and as described hereinbefore.

In operation of this embodiment sprayer section 112 is held stationary while lower container section 111 is rotated to the right. However, in this embodiment cylinder 114 moves upwardly over stationary piston 113 is response to the action of operating members 125 against the cooperating members 124 fixed to the underside of cylinder 114, spline 140 slidably moving in mating bore 122 in sprayhead or section 112. Spring 116 is thereby compressed, valve 119 opens and liquid flows into chamber 115 through conduit 118 from receptacle 131, charging sprayer 110 with liquid.

Cylinder 114 cam members 124, also comprise a pressurization delay means or dwell 126 similar to dwell 26 on piston 13, hence it can be seen that valve 119 is permitted to close prior to pressurization of the liquid in chamber 115 as before, and a full charge therein is assured. Valve retainer 134 operates in like manner to retainer 34 to restrict upward movement of valve 121 and similar guides 143 and detents 144 are incorporated on members 124 and container 111 respectively which also operate in this embodiment to obtain the same advantages as described for the previously described preferred embodiment.

To discharge liquid from sprayer 110, push-button 17-a is depressed after insuring the safety lever 38 is again in the proper position. Liquid now under pressure of spring 116 in chamber 115, enters outlet conduit 120, flows into open valve 21, through hollow stem 37 and out of discharge nozzle 17 in a spray. As was indicated previously, cylinder 114 reciprocates and piston 113 is stationary, operating members 124 thereon cooperating with operating members 125 in container 111 corresponding in every respect to members 24 and 25 and operating in the same way. In addition, a probe 142 is carried on the upper interior wall of cylinder 114 and operates to provide the same precision liquid flow shut-off. An O-ring 113-b on piston 113 provides a seal between it and cylinder 114. This embodiment then, is an example of a movable cylinder as opposed to a movable piston which is nevertheless capable of achieving all of the advantages heretofore described for the preferred embodiment.

Figure 15:
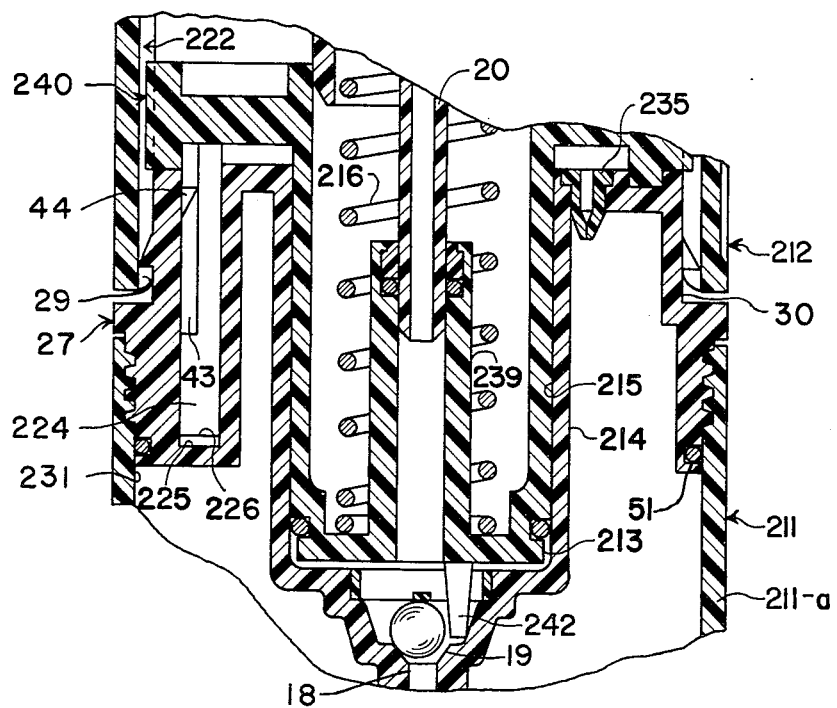
FIG. 15 is a fragmentary, vertical section of another embodiment of the invention.
Figure 16:
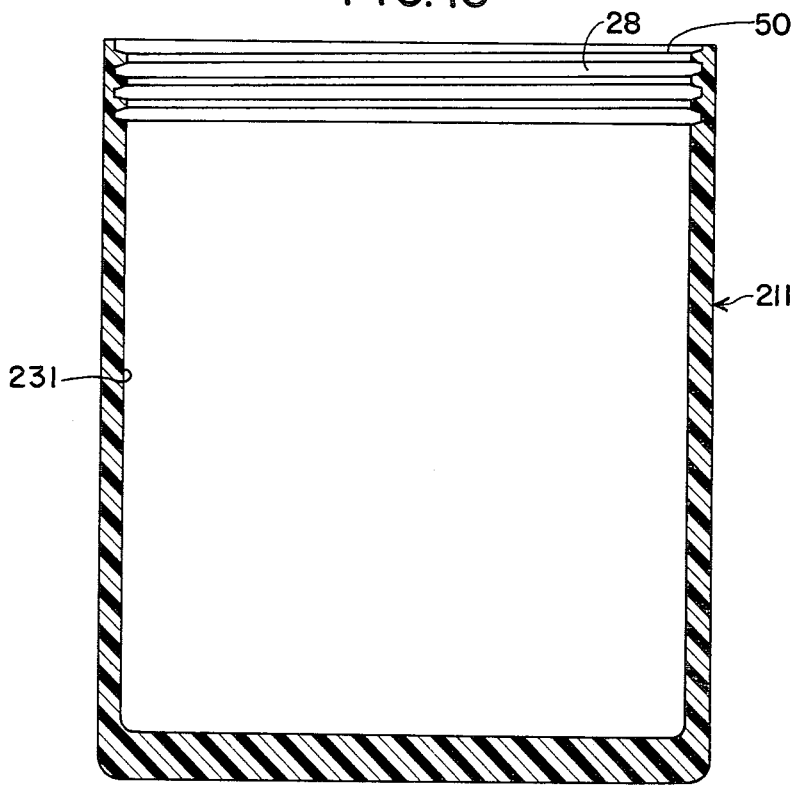
FIG. 16 is a vertical section of a movable section or container of the embodiment of FIG. 15; and, FIG. 17 is a vertical section of a detail comprising a cover for the embodiment of FIG. 15.
Figure 17:
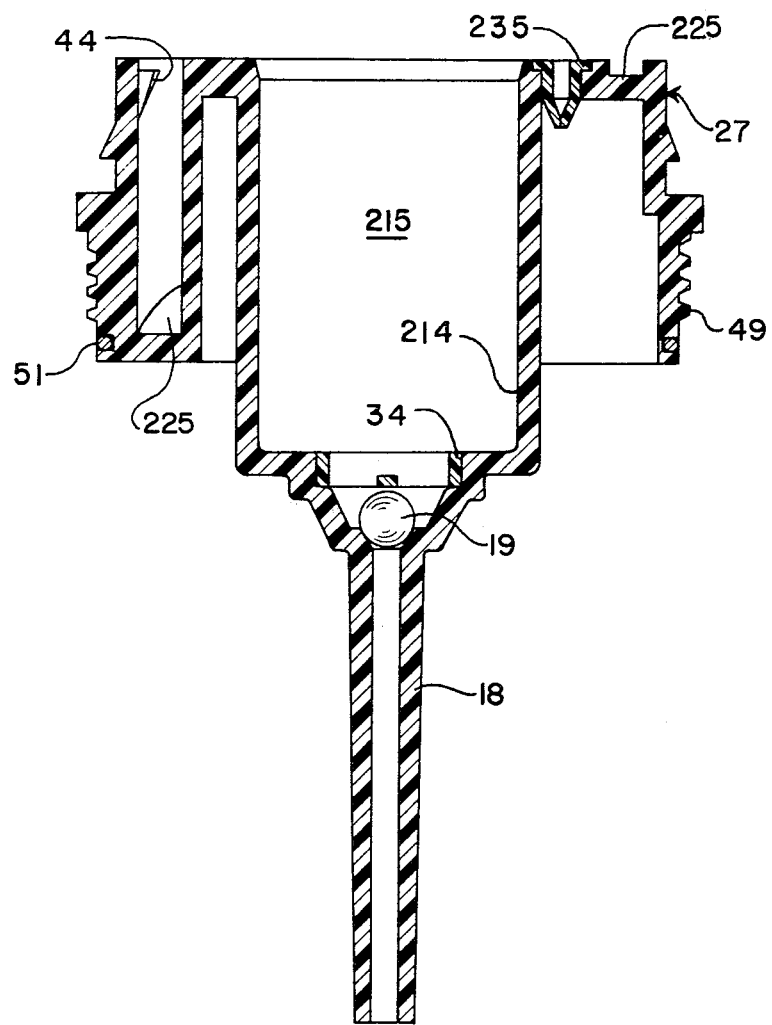

In FIGS. 15, 16 and 17 is yet another embodiment of the invention which comprises a spray container 210 having upper and lower rotating sections or end closures 212 and 211 respectively, and, in addition, comprises a cover member 27 (FIG. 17), which contains a cylinder 214 mounted centrally therein and a pair of operating cam members 225 connected thereto. Cover member 27 also contains inlet conduit 18, valve 19 and valve retainer 34 of the preferred embodiment also shown in FIG. 17. In FIG. 16, a container 211 is disclosed which has an opening 28 and a top threaded portion 50 therein. Threaded portion 50 sealingly engages peripheral threaded portion 49 of cover 27 to form a closure for a receptacle 231 in container 211.

Spray section 212 is substantially the same as section 12 in FIGS. 1 and 2 and includes an internal mating bore 222 for receiving in sliding contact therewith a spline 240 attached to a piston 213 mounted for reciprocation in a cylinder 214 of cover 27. It can therefore be seen that this embodiment is, in almost all respects, the same as the previously described, preferred embodiment except for cover 27 and modified container 211. This modification of basic sprayer 10 results in a combination in which filling of receptacle with liquid is facilitated and in which certain parts are easier to replace or repair. In sprayer device 210 section 212 is attached by being press fitted over cover 27 until ridge or shelf 29 engages bevelled rim or notch 30. Container 211 is then installed by turning threaded portion 50 onto threaded portion 49, receptacle 231 being filled with liquid to be sprayed through opening 28. An "O"-ring 51 (FIG. 17) provides a liquid seal for container 11 against cover 27. A vent valve 235 is an annular wall 223 of cover 27 provides for venting receptacle 231 to the atmosphere. Annular wall 223 connects a pair of operating members 225 to cylinder 214, members 225 operatively associating with cooperating members 224 on piston 213, as disclosed in the previously described embodiments. In operation of this embodiment, assembled sprayer 210 is held in the left hand as in the previously described devices with spray section stationary while container section 21 is rotated. Charging of chamber 215 is accomplished as before, which opens valve 19 to allow liquid to flow thereinto. Piston 213, constructed similarly to piston 13 in sprayer 10 contains operating members 224, delay means 226 and piston probe 242 corresponding to members 24, delay 26, and probe 42 of piston 13. After charging of chamber 215 with liquid, discharging is accomplished in the same manner as for the two previous sprayer embodiments, utilizing push-button 17-a, to open discharge valve 21 and spraying liquid through nozzle 17.

In the preceding description of the present invention, a preferred discharge valve 21 has been described. It should be understood however, that other types of valves can be used for discharge valve 21 without impairment of the invention's usefulness or efficiency. For example, many well known piston or plunger type valves are known and can be used as well, a particular one being shown in U.S. Pat. No. 3,790,034 to William Horvath above mentioned and incorporated herein by reference. In fact, many other constructions are known and can be used to good effect. Among these are the discharge valves shown in the previously mentioned T. Nozawa et al, U.S. Pat. Nos. 3,746,261, 3,777,945, 3,797,748 and 3,799,448, also incorporated herein by reference. Thus, while discharge valve 21 has been herein shown and described as a flexible element duck bill device, its selection is merely a matter of convenience and should not be considered as necessary to the present invention either in construction or operation.

What has hereinbefore been described as an advance in the art of dispensers, sprayers and the like, is spray container of two relatively rotatable sections which cooperate on rotation of one part relative to the other to charge an internal, pressurizable chamber with liquid to be sprayed and which advantageously comprises elements and other means for insuring a full charge before pressure is applied, additional means for precise shut-off liquid spray and means for positively indicating the end of the charge cycle.

What is claimed is:

1. A liquid dispensing device of the type which comprises a container adapted to contain a body of liquid to be dispensed and which is formed into relatively rotatable sections, a relatively reciprocable piston and cylinder defining a pressurizable chamber therebetween, resilient means operatively engaging one of said piston and cylinder and biased to tend to produce relative motion therebetween in a direction to pressurize the chamber, liquid dispensing means mounted on the device externally thereof, first conduit means communicating with the body of liquid and the chamber, said first conduit means including a check valve to prevent flow of liquid from the chamber to the body of liquid, second conduit means communicating with the chamber and with said liquid dispensing means, manually operable valve means in said second conduit for controlling the flow of liquid therethrough, means for connecting one of said rotatable sections to the piston and means for connecting the other of said rotatable sections to the cylinder whereby relative rotation of said rotatable sections produces relative movement of said piston and cylinder to compress said resilient means and to draw liquid from said body of liquid into said chamber, a first operating member on said piston, a second operating member on said cylinder positioned to cooperate with said first operating member in mutual cooperative relation, said two members being urged toward one another by said resilient means, each of said members being connected to one of said rotatable sections, relative rotation of said sections acting through said members thereby producing relative reciprocable movement of said piston and cylinder and, one of said members further including delay means adapted to engage said other member for terminating relative reciprocable movement of said piston and cylinder and compression of said resilient means before relative rotation of said rotatable section is terminated.

2. The dispensing device according to claim 1 in which the second conduit means is rigid.

3. The dispensing device according to claim 1 in which the delay means is on the piston operating member.

4. The dispensing device according to claim 1 in which the delay means is on the cylinder operating member.

5. The dispensing device according to claim 1 further including indicator means for determining when the chamber is charged with liquid comprising, a guide on one of the members and cooperating detent means on one of the rotatable sections, the guide and the detent means adapted to come into engagement when said section is rotated to provide a limit of rotation of said section and an indication of completion of charging of said chamber.

6. The dispensing device according to claim 1 further including means on one of said piston and cylinder adapted to engage the check valve to open said valve and relieve the pressure of the liquid in the chamber before the chamber is empty of liquid.

7. The dispensing device according to claim 1 in which one of first and second operating members is a cam having a substantially helical surface operably contacting said other member.

8. The dispensing device according to claim 7 in which the delay means is a flat surface on the end of said helical surface.

9. The dispensing device according to claim 7 in which the other of said first and second operating members is a cam having a substantially helical surface.

10. The dispensing device according to claim 9 in which the delay means is a flat surface on the end of said helical surface of said other member cam.

11. The dispensing device according to claim 1 in which the delay means is a plateau on the end portion of said member with which it is included.

12. A dispensing container for liquids, said container having relatively rotatable upper and lower parts, one of said parts including a receptacle for holding liquid to be dispensed and having a side wall and opposite ends, a liquid dispenser on one of said parts of said container, a cylinder mounted in said container in one of said parts, a piston in the cylinder mounted for relative reciprocation between the piston and the cylinder, said piston and cylinder defining a chamber for liquid to be dispensed, a first conduit in said container for conducting liquid to said chamber, check valve means in said first conduit to enable liquid flow into said chamber through said first conduit and to prevent reverse flow therethrough, a second conduit in said container for conducting liquid from said chamber to said dispenser, manually operated, normally closed valve means in the said second conduit to normally prevent flow of liquid from said chamber and operable to enable flow from said chamber to said dispenser, spring means engaging said piston to urge relative reciprocation between said piston and cylinder to pressurize liquid in said chamber and dispense said liquid through said dispenser when said valve in said second conduit is opened, manually operable, rotatable operating means carried by one of said upper and lower parts of said container externally of said receptacle, a piston rod connected at one end thereof to said piston and extending axially in said cylinder, means on said piston radially displaced from said piston rod adapted to engage said operating means so that relative rotation between said container upper and lower parts causes relative reciprocation between said piston and cylinder to compress said spring means and enlarge said chamber to draw liquid thereinto for subsequent dispensing of said liquid when said manually operated valve is opened and said spring means expands to pressurize said liquid, and said operating means further includes delay means for delaying pressurization of said liquid in said chamber adapted to engage said radially displaced means on said piston for terminating reciprocation therebetween and compression of said spring means before relative rotation between said container upper and lower parts terminates.

13. The container according to claim 12 in which said second conduit is rigid.

14. The container according to claim 12 in which the container has a cover member, one of the piston and cylinder is contained by the cover member substantially on the underside thereof, the opposite ends of the container comprising top and bottom parts thereof, the top part being mounted on the outside of the cover member, the piston rod effectively connected to the top part so that the piston rotates therewith, the operating means is connected to the piston and rotates therewith, and means fixed to said cylinder adapted to engage the rotating operating means to produce reciprocation of the cylinder relative to the piston.

15. The container according to claim 12 in which the operating means comprises a cam rotatable with said operating means, said cam having a substantially helical surface operatively engaging a portion of said piston to initiate said relative reciprocation between said cylinder and said piston in a direction out of said cylinder.

16. The container according to claim 15 in which the portion of the piston engaged by said helical surface of said cam is also a helical surface.

17. The container according to claim 15 in which the pressurization delay means is a plateau on one end of the helical surface of said cam.

18. The container according to claim 16 in which the pressurization delay means is a plateau on one end of the piston portion helical surface.

19. A dispensing container for liquids, said container having a side wall and end closure means on opposite ends of said container, one of said end closure means being rotatable relative to the side wall, a cylinder carried by the side wall within the container, a piston slidably mounted in the cylinder and defining with the cylinder an expansible chamber for liquid to be dispensed, a piston rod connected at one end thereof to said piston extending axially in said cylinder, means slidably connecting said piston to said rotatable end closure means, means enabling rotation of said rotatable end closure means to cause relative reciprocation between said piston and cylinder in a direction to expand said chamber, resilient means operatively connected with said piston to cause relative reciprocation between said piston and cylinder in a direction to reduce the size of said chamber and pressurize liquid therein, discharge means on one end of said container, conduit means connected between said chamber and said discharge means, valve means in said conduit means to control flow of liquid therethrough and operable to permit discharge of liquid through said dispensing container by the pressure of said resilient means and, one of said piston and rotatable end closure means including pressurization delay means adapted to come into engagement with the other of said piston and end closure means for terminating relative reciprocation between said cylinder and piston before rotation of the end closure means is terminated.

20. A liquid dispenser having a liquid container, an opening for filling the container with liquid, a piston and cylinder mounted in the dispenser for relative reciprocation therebetween and defining a pressurizable chamber for liquid to be dispensed, a manually operated discharge valve on said dispenser, chamber inlet and outlet conduits connecting said chamber to said container and said discharge valve respectively, a check valve in said inlet conduit, said dispenser being formed of relatively rotatable upper and lower parts, means connecting one of said parts to the cylinder and means connecting the other of said parts to the piston, resilient means in said dispenser positioned therein to urge relative reciprocation between said piston and cylinder in a direction to pressurize the liquid in said chamber, first means carried by said piston and second means carried by said cylinder, said first and second means having cooperating surfaces urged toward one another by said resilient means, each of said surfaces having opposed high and low points and sloping surfaces between said high and low points whereby relative rotation of said upper and lower parts produces relative reciprocation between said piston and cylinder to compress said resilient means and draw liquid into said chamber from said container, and delay means on one of said piston and cylinder for delaying pressurization of said liquid in said chamber by said resilient means, said delay means adapted to engage a portion of the other of said piston and cylinder for terminating reciprocation between said piston and cylinder and compression of said resilient means before relative rotation between said upper and lower parts terminates.

* * * * *